(12) United States Patent
Lee et al.

(10) Patent No.: US 8,705,569 B2
(45) Date of Patent: Apr. 22, 2014

(54) APPARATUS AND METHOD FOR GENERATING AN MPEG-2 TRANSPORT PACKET HAVING A VARIABLE PACKET LENGTH

(75) Inventors: Yong Ju Lee, Daejeon (KR); Jeongil Seo, Daejeon (KR); Eung Don Lee, Daejeon (KR); Kyeongok Kang, Daejeon (KR); Jin Soo Choi, Daejeon (KR); Jin Woo Hong, Daejeon (KR); Jin Woong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 181 days.

(21) Appl. No.: 13/380,656

(22) PCT Filed: Jun. 18, 2010

(86) PCT No.: PCT/KR2010/003942
§ 371 (c)(1),
(2), (4) Date: Dec. 23, 2011

(87) PCT Pub. No.: WO2010/151007
PCT Pub. Date: Dec. 29, 2010

(65) Prior Publication Data
US 2012/0120969 A1    May 17, 2012

(30) Foreign Application Priority Data

Jun. 24, 2009  (KR) .................. 10-2009-0056245
Nov. 30, 2009  (KR) .................. 10-2009-0116651

(51) Int. Cl.
*H04J 3/16* (2006.01)

(52) U.S. Cl.
USPC .......................................... 370/471; 370/535

(58) Field of Classification Search
USPC ............... 370/471, 535; 709/535; 375/240.26
See application file for complete search history.

(56) References Cited

U.S. PATENT DOCUMENTS

| | | | | |
|---|---|---|---|---|
| 2004/0103218 | A1* | 5/2004 | Blumrich et al. | 709/249 |
| 2006/0133429 | A1* | 6/2006 | Seo et al. | 370/535 |
| 2007/0053663 | A1 | 3/2007 | Yahata et al. | |
| 2009/0052548 | A1* | 2/2009 | Jeong et al. | 375/240.25 |
| 2013/0136189 | A9* | 5/2013 | Fu | 375/240.26 |

FOREIGN PATENT DOCUMENTS

| | | |
|---|---|---|
| KR | 1020010035621 A | 5/2001 |
| KR | 1020010035621 A | 7/2001 |
| KR | 1020070092500 A | 9/2007 |
| KR | 1020080093002 A | 10/2008 |
| WO | WO01/03305 A1 | 1/2001 |

* cited by examiner

*Primary Examiner* — Albert T Chou
(74) *Attorney, Agent, or Firm* — William Park & Associates Patent Ltd.

(57) ABSTRACT

Provided is a transport packet generating apparatus that generates a transport packet having a variable length, and the length of the transport packet is indicated by a field included in a header of the transport packet or a synchronization area of the transport packet, in the field indicating a length of the transport packet. A transport depacketizing apparatus depacketizes the transport packet by decoding the field or detecting a starting point of the transport packet based on a predetermined rule with respect to the synchronization area to decode the transport packet.

20 Claims, 6 Drawing Sheets

APPARATUS AND METHOD FOR GENERATING AN MPEG-2 TRANSPORT PACKET HAVING A VARIABLE PACKET LENGTH

TECHNICAL FIELD

The present invention relates to a packet generating apparatus and method for a multimedia transmission, and more particularly, to a transport packet generating apparatus and method that may set a transport packet to have a variable length.

This work was supported by the IT R&D program of KCC. [2008-F-011-01, Development of core technology of next generation DTV—Development of autostereoscopic personal 3D broadcast technologies]

BACKGROUND ART

An MPEG-2 is a standard associated with an audio and video encoding or coding defined by an MPEG, and is published as an ISO standard 13818. Generally, the MPEG-2 is used for transmitting audio and video information for a digital broadcast, such as a digital satellite broadcast, a digital wired broadcast, and the like. Also, an encoding format that is slightly modified from the MPEG-2 may be used as a standard of a commercial DVD.

The MPEG-2 may be similar to an MPEG-1 in that both are standards related to the audio and video encoding, and the MPEG-2 may support an interlaced image used in a TV broadcast. The MPEG-2 video may be inappropriate for a low bit-rate, such as 1 MBits/s, and may have an improved compression rate compared with the MPEG-1 that uses a bit-rate of more than 3 Mbits.

A feature of the MPEG-2 different from the MPEG-1 is that a transport stream (TS) appropriate for an environment where a great amount of data loss occurs is defined, and the TS is now used for the digital broadcast.

DISCLOSURE OF INVENTION

Technical Goals

An aspect of the present invention provides a transport packet generating apparatus and method that sets a transport packet to have a variable length as opposed to limiting the length to 188 bytes, and thus, effectively decreases a loss of a data transmission efficiency due to a transport packet header.

Technical Solutions

According to an aspect of an embodiment, there is provided a transport packet generating apparatus, and the apparatus includes a packet generating unit to generate a transport packet having a variable length.

According to another aspect of an embodiment, there is provided a transport packet depacketizing apparatus, and the apparatus includes a depacketizing unit to depacketize a transport packet having a variable length.

According to another aspect of an embodiment, there is provided a transport packet generating method, and the method includes generating a transport packet having a variable length, and the length being a multiple of a predetermined number of bytes.

According to another aspect of an embodiment, there is provided a transport packet depacketizing method, and the method includes depacketizing a transport packet having a variable length, the length being a multiple of a predetermined number of bytes.

Effect

According to an embodiment of the present invention, a loss of data transmission efficiency due to a transport packet header may decrease.

According to another embodiment of the present invention, equipment receiving a transport packet may easily decode the transport packet.

BEST MODE FOR CARRYING OUT THE INVENTION

Although a few embodiments of the present invention have been shown and described, the present invention is not limited to the described embodiments, wherein like reference numerals refer to the like elements throughout.

Figure 1:
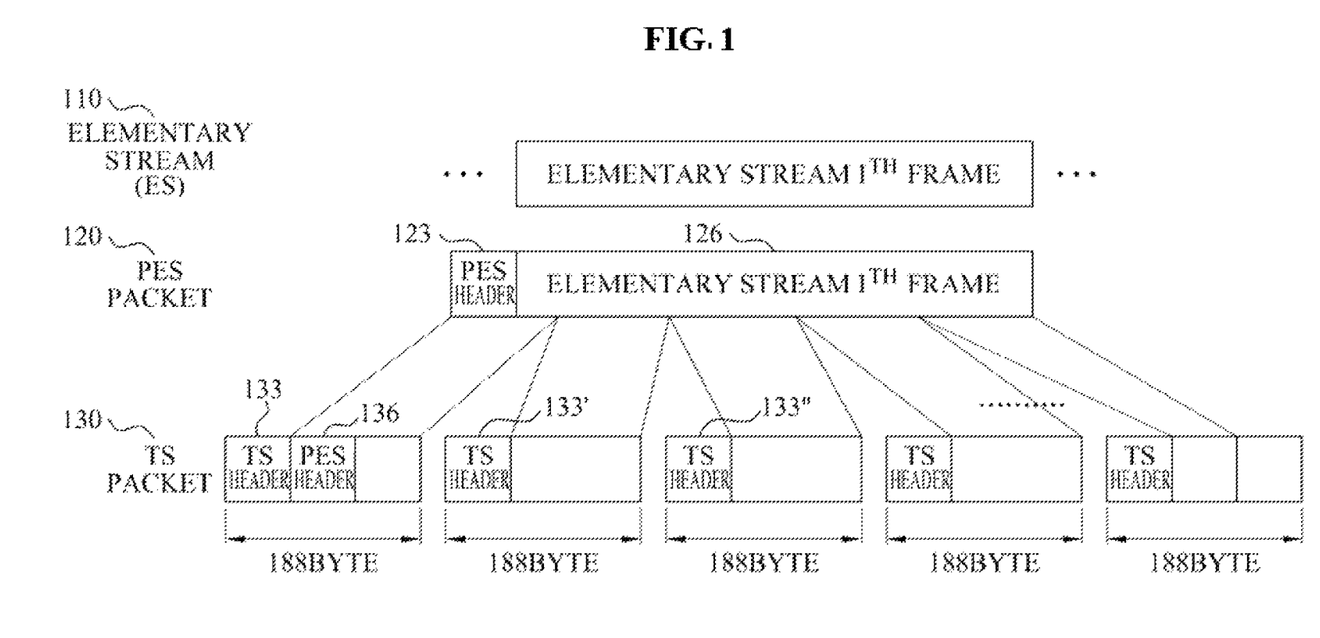
FIG. 1 is a diagram illustrating a transport packet according to a conventional MPEG-2 system standard.

FIG. 1 illustrates a transport packet according to an MPEG-2 system standard.

Referring to FIG. 1, an MPEG-2 system standard may packetize a multimedia elementary stream (ES) 110 into a packetized elementary stream (PES), and may generate a transport stream (TS) packet 130 from the PES to transmit. In this case, a size of a single transport packet is fixed to 188 bytes.

A transport packet may be set to include at least four bytes of a TS header 133 including a 1 byte sync-byte, and a size of data to be transmitted by the transport packet may be a maximum of 184 bytes.

Accordingly, when a multimedia is transmitted using the MPEG-2 transport packet, four-byte data loss per 188 bytes may occur and the data loss may be about 2.13% of all data.

The data loss due to a header may increase in direct proportion to a number of transport packets, namely the TS packets, included in the ES 110.

Accordingly a standard associated with imaging equipment, in an SMPTE310 scheme, determined by an SMPTE, the MPEG-2 transport packet is transmitted based on 19.392685 Mbps, and a loss caused by a transport packet header may be about 0.412609 Mbps.

When the length of the transport packet is not fixed to 188 bytes and the length may be extended, the data loss may decrease. For example, when the length of transport packet is 376 bytes corresponding to 188×2, the loss due to the transport packet header may be 4/376 which is about 1.06% of the all data. When the length of the transport packet increases by three-fold or four-fold, the loss due to the transport packet header may further decrease.

Accordingly, a transport packet generating apparatus according to an embodiment may not limit the length of the transport packet to 188 bytes, and may set the length of the transport packet to be a multiple of 188 bytes.

Figure 2:
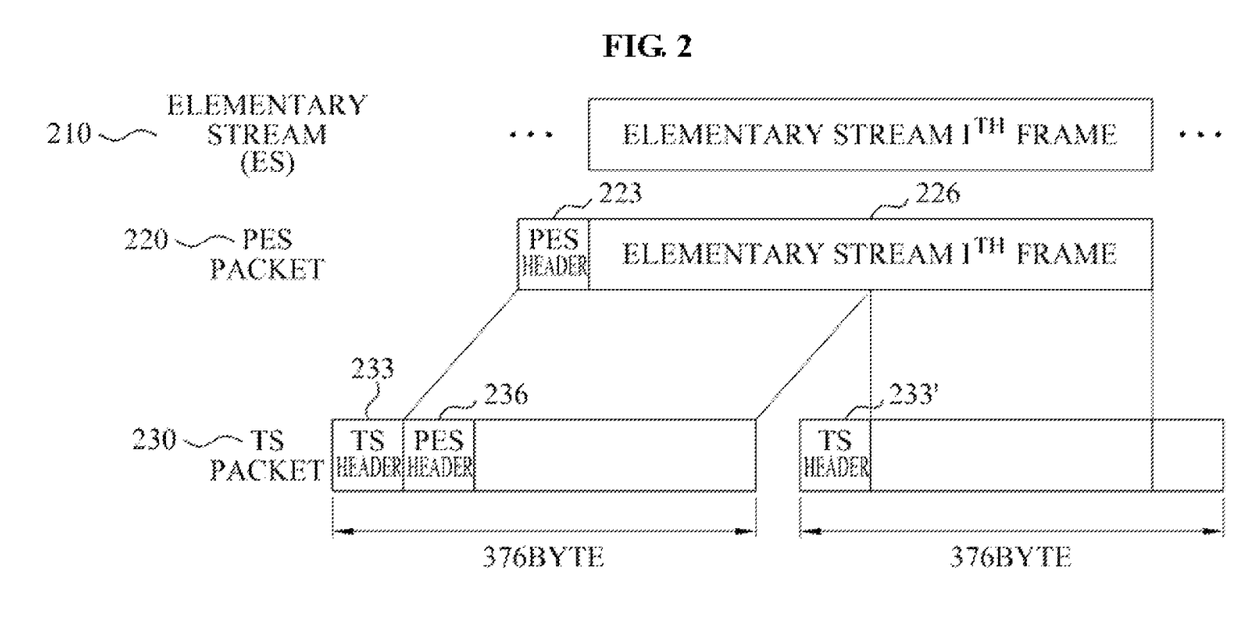
FIG. 2 is a diagram illustrating a configuration of a transport packet and a transport packet generating method when a length of a transport packet increases by two-fold according to an embodiment of the present invention.

FIG. 2 illustrates a configuration of a transport packet 230 and a transport packet generating method when a length of the transport packet 230 increases by two-fold according to an embodiment of the present invention.

The transport packet generating apparatus may generate a transport packet 230, namely, a TS packet 230, having a variable length.

A length of the transport packet 230 may be a multiple of a predetermined number of bytes. For example, the predetermined number of bytes may be 188 bytes which is a length of a transport packet used in a conventional MPEG-2 standard.

The transport packet generating apparatus may include, in a transport packet header 233, namely, a TS header 233, of the transport packet 230, a field indicating a length of the transport packet 230.

Header information included in a transport packet may indicate a length of the transport packet by increasing a value of the field by one.

For example, in a case where a two-bit field is included in the transport packet, when a value of the field is '0b00', the length of the transport packet may be one times 188 bytes, when the value of the field is '0b01', the length of the transport may be 376 bytes that is two times 188 bytes, and when the value of the field is '0b10', the length of the transport packet may be three times 188 bytes. The length of the transport may be indicated by increasing the value of the field by one.

The transport packet generating apparatus may indicate the length of transport packet by inverting each bit of a value of the field in the transport packet header 233 of the transport packet 230 according to a predetermined rule, and the rule, for example, may sequentially invert even numbered bits of the value of the field.

The transport packet generating apparatus may include, in the transport packet 230, a synchronization area (sync_byte) to indicate the length of the transport packet.

The transport packet generating apparatus may change '0x47' that is the sync_byte of the transport packet 230 to indicate the length of the transport packet 230. The length of the transport packet 230 may be indicated by increasing a value of the sync_byte by one or changing a value of a predetermined area in the sync_byte.

When the length of the transport packet 230 is 188 bytes, the sync_byte may be set to '0x47', when the length of the transport packet 230 is doubled, the sync_byte may be set to '0x48', and when the length of the transport packet 230 is tripled, the sync_byte may be set to '0x49'.

A depacketizing apparatus may be used to depacketize the transport packet 230 generated by the transport packet generating apparatus. Hereinafter, a transport packet depacketizing apparatus is described.

The transport packet depacketizing apparatus according to an embodiment of the present invention may depacketize the transport packet 230 having a variable length, and the length of the transport packet 230 may be a multiple of a predetermined number of bytes. The predetermined number of bytes may be set to 188 bytes in the same manner as the packetization.

When the length of the transport packet 230 indefinitely increases, decrease of data transmission efficiency due to a transport packet header may decrease. However, a problem, such as a difficulty in detecting a sync_byte of the transport packet 230 and the like, may occur. Accordingly, a maximum length of the transport packet 230 may be appropriately limited.

When the length of the transport packet 230 is excessively long, a data transmission efficiency of data having a short access unit (AU), such as audio data, may decrease. The AU for data is a concept identical to a frame for an audio.

For example, when a length of a frame of a single audio is 150 bytes, the frame may be transmitted by a transport packet having 188 bytes.

When the length of the transport packet 230 further increases, the length of the transport packet 230 increases, whereas a size of data included in the transport packet 230 is maintained. Therefore, the data transmission efficiency may decrease.

Accordingly, when a length of a transport packet is flexibly set based on various cases, as opposed to being fixed to a predetermined value, the data transmission efficiency may improve.

When the length of the transport packet 230 is flexible in a substantially wide range, a difficulty in detecting the sync_byte of the transport packet 230 may occur.

For example, when the transport packet 230 is divided based on 188 bytes unit, a starting point of the transport packet 230 may be detected by detecting '0x47' that is the sync_byte of the transport packet from an inputted MPEG-2 transport packet and determining whether '0x47' is detected again after 187 bytes. However, when the length of the transport packet 230 is flexible in the substantially wide range, the described method may not be applied.

Accordingly, when the length of the transport packet 230 is limited to a multiple of the 188 bytes, the starting point of the transport packet 230 may be detected in the similar manner as the conventional method.

When the length of the transport packet 230 is not limited to 188 bytes and is set to have the multiple of 188 bytes, a loss of transmission efficiency due to the transport packet header may decrease.

The transport packet header may include the field indicating the length of the transport packet 230, and thus, equipment for receiving the transport packet 230 may easily decode the transport packet 230.

The transport packet depacketizing apparatus may include, in the header included in the transport packet 230, the field indicating the length of the transport packet 230, and may decode the transport packet 230 based on the field.

The transport packet depacketizing apparatus may check the sync_byte of the transport packet 230 for each multiple length of the predetermined number of bytes, and may detect a starting point of the transport packet 230 based on a predetermined rule with respect to the sync_byte to decode the transport packet 230.

The predetermined rule may increase a value of the sync_byte by one or may change a value of a predetermined area in the sync_byte, to indicate the length of the transport packet 230.

The transport packet depacketizing apparatus may detect the starting point of the transport packet 230 from the transport packet header 233 based on the field indicating the length of the transport packet 230 to decode the transport packet 230.

The transport packet depacketizing apparatus may not detect the sync_byte of the transport packet 230 from each 188 bytes, and may check the sync_byte of the transport packet 230 for each multiple length of 188 bytes to depacketize the transport packet 230 having a variable length.

A transport packet generating method may generate the transport packet 230 having a variable length, the length being a multiple of a predetermined number of bytes.

The transport packet 230 may include a header including a field indicating a length of the transport packet 230, and the length of the transport packet 230 may be indicated by a value of the field.

The transport packet may include a sync_byte as described in the description of the transport packet generating apparatus, and the length of the transport packet 230 may be indicated by the sync_byte.

A method of indicating the length of the transport packet based on the sync_byte or the field included in the header of the transport packet 230 may be the same as the method by the transport packet generating apparatus.

A depacketizing method may be used to depacketize the transport packet 230 generated by the transport packet generating method. Hereinafter, a transport packet depacketizing method is described.

The transport packet depacketizing according to an embodiment may depacketize the transport packet 230 having a variable length, and the length of the transport packet 230 may be a multiple of a predetermined number of bytes.

The transport packet 230 may include a field indicating a length of the transport packet 230 in a header of the transport packet.

A starting point of the transport packet 230 is detected based on a value of the field and the transport packet 230 is decoded from the detected starting point of the transport packet 230, to depacketize the transport packet 230.

When the starting point of the transport packet is detected, a sync_byte of the transport packet 230 is checked for each multiple length of a predetermined number of bytes and the starting point of the transport packet 230 is detected based on a predetermined rule with respect to the sync_byte.

The predetermined rule may increase a value of the sync_byte by one or may change a value of a predetermined area in the sync_byte, to indicate the length of the transport packet 230.

Figure 3:
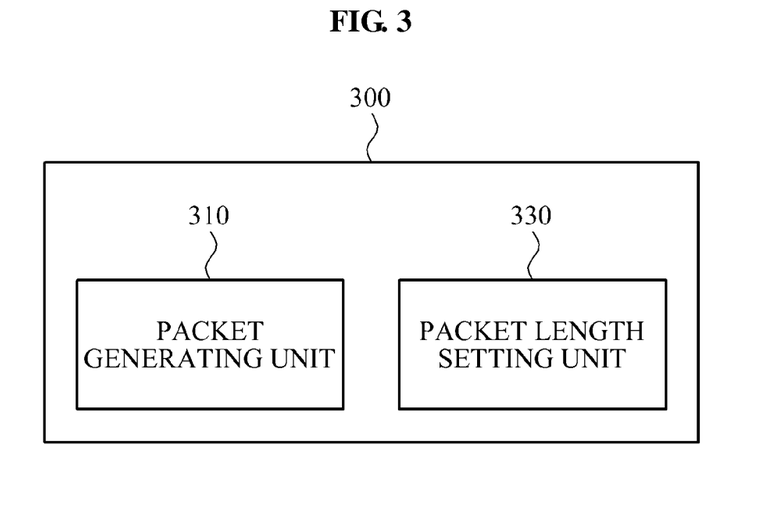
FIG. 3 is a block diagram illustrating a transport packet generating apparatus according to an embodiment of the present invention.

FIG. 3 illustrates a transport packet generating apparatus 300 according to an embodiment of the present invention.

Referring to FIG. 3, the transport packet apparatus 300 may include a packet generating unit 310 and a packet length setting unit 330.

The packet generating unit 310 may generate a transport packet having a variable length, and the length of the transport packet may be a multiple of a predetermined number of bytes. The predetermined number of bytes may be 188 bytes.

The packet length setting unit 330 may set a field indicating the length of the transport packet in an area of a header, and the packet generating unit 310 may allocate the area of header to the transport packet.

The packet length setting unit 330 may indicate the length of the transport packet by increasing a value of the field by one or may indicate the length of the transport packet by inverting each bit of the value of the field.

The transport packet generating apparatus may indicate the length of the packet using a sync_byte of the transport packet.

The transport packet generating unit 310 may set the sync_byte in the transport packet, and the packet length setting unit 330 may indicate the length of the transport packet based on the sync_byte.

The packet length setting unit 330 may indicate the length of the transport packet by increasing a value of the sync_byte by each one or by changing a value of a predetermined area in the sync_byte.

Figure 4:
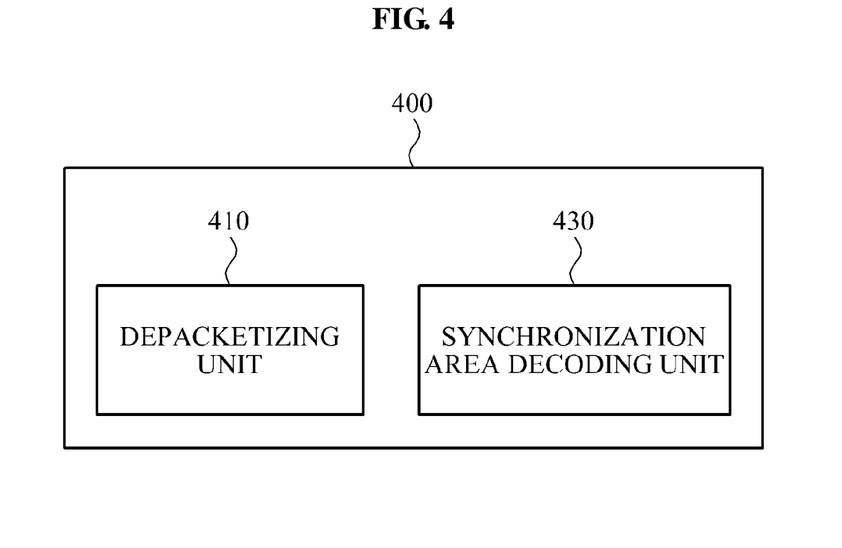
FIG. 4 is a block diagram illustrating a transport packet depacketizing apparatus according to an embodiment of the present invention.

FIG. 4 illustrates a transport packet depacketizing apparatus 400 according to an embodiment of the present invention.

Referring to FIG. 4, the transport packet depacketizing apparatus 400 may include a depacketizing unit 410 and a synchronization area decoding unit 430.

The depacketizing unit 410 may depacketize a transport packet having a variable length, and the length of the transport packet may be a multiple of 188 bytes.

The transport packet may include a header including a field indicating a length of the transport packet.

The depacketizing unit 410 may decode the transport packet based on the field.

The synchronization area decoding unit 430 may check a sync_byte of the transport packet for each multiple length of a predetermined number of bytes, and may detect a starting point of the transport packet based on a predetermined rule with respect to the sync_byte.

Figure 5:
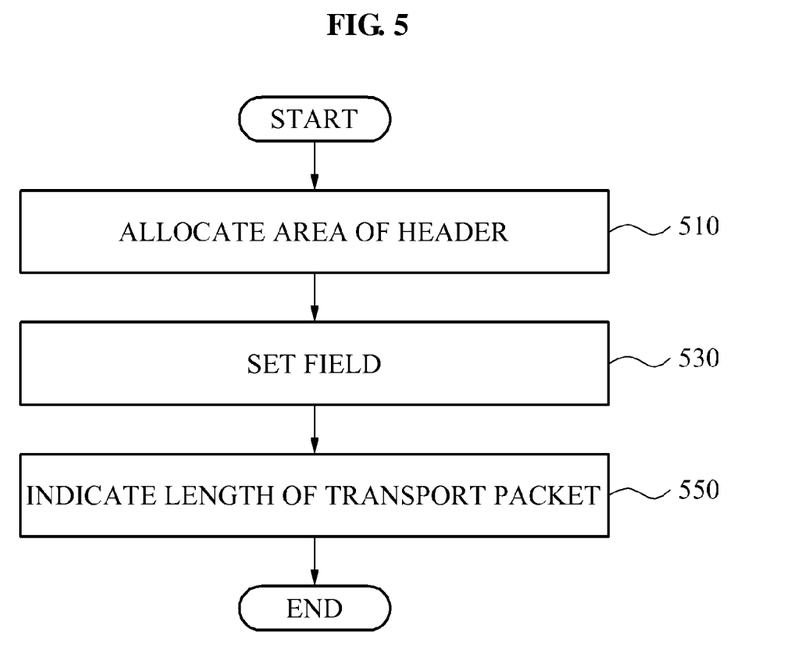
FIG. 5 is a flowchart illustrating a transport packet generating method according to an embodiment of the present invention.

FIG. 5 is a flowchart illustrating a transport generating method according to an embodiment of the present invention.

Referring to FIG. 5, the transport packet generating method may generate a transport packet having a variable length, and the length of the transport packet may be a multiple of a predetermined number of bytes. In this case, the transport packet generating method may allocate an area of a header to the transport packet in operation 510, may set a field indicating the length of the transport packet in the area of the header in operation 520, and may indicate the length of the transport packet based on a value of the field in operation 530.

The transport packet generating method according to an embodiment may set a sync_byte in the transport packet and may indicate the length of the transport packet based on the set sync_byte.

Figure 6:
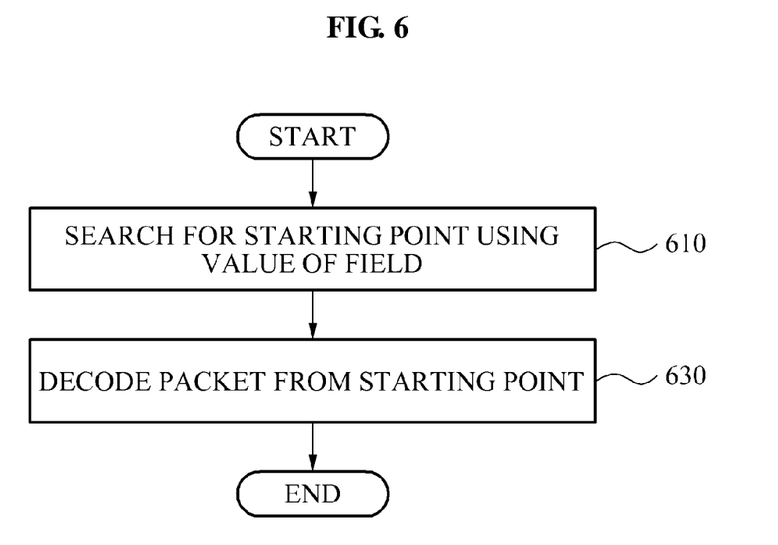
FIG. 6 is a flowchart illustrating a transport packet depacketizing method according to an embodiment of the present invention.

FIG. 6 is a flowchart illustrating a transport packet depacketizing method according to an embodiment of the present invention of the present invention.

Referring to FIG. 6, the transport packet depacketizing method according to an embodiment of the present invention may depacketize a transport packet having a variable length, and the length of the transport packet may be a multiple of a predetermined number of bytes. The transport packet may include, in a header of the transport packet, a field indicating the length of the transport packet.

The transport packet depacketizing method may detect a starting point of the transport packet based on a value of the field in operation 610 and may decode the transport packet from the detected starting point of the transport packet in operation 630.

The transport packet depacketizing method may check a sync_byte of the transport packet for each multiple length of a predetermined number of bytes and may detect the starting point of the transport packet based on a predetermined rule with respect to the checked sync_byte.

The descriptions with reference to FIGS. 1 and 2 may be used to understand an element having the same name, a terminology, and the like used in the descriptions of the transport packet generating method and apparatus and the transport packet depacketizing apparatus and method with reference to FIGS. 3 through 6.

The methods according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An apparatus of generating a transport packet, the apparatus comprising:
   a packet generating unit to generate a transport packet having a variable length by packetizing an elementary stream and inverting each bit of a value of a field in a header of the transport packet,
   wherein a synchronization area is configured in the transport packet to indicate the variable length.

2. The apparatus of claim 1, wherein the packet generating unit sets the length of the transport packet to be a multiple of a predetermined number of bytes.

3. The apparatus of claim 2, wherein the predetermined number of bytes is 188 bytes.

4. The apparatus of claim 1, further comprising:
   a packet length setting unit to set the field in an area of the header, the field indicating the length of the transport packet,
   wherein the packet generating unit allocates the area of the header to the transport packet.

5. The apparatus of claim 4, wherein the packet length setting unit increases the value of the field by one to indicate the length of the transport packet.

6. The apparatus of claim 4, wherein the packet length setting unit inverts each bit of the value of the field to indicate the length of the transport packet.

7. The apparatus of claim 1, further comprising:
   a packet length setting unit to indicate the length of the transport packet using the synchronization area,
   wherein the packet generating unit sets the synchronization area in the transport packet.

8. The apparatus of claim 7, wherein the packet length setting unit increases a value of the synchronization area by one to indicate the length of the transport packet.

9. The apparatus of claim 7, wherein the packet length setting unit changes a value of a predetermined area of the synchronization area to indicate the length of the transport packet.

10. An apparatus of depacketizing a transport packet, the apparatus comprising:
    a depacketizing unit to depacketize a transport packet having a variable length by checking the transport packet for each multiple length of a predetermined number of bytes and detecting a starting point of the transport packet,
    wherein a synchronization area in the transport packet indicates the variable length.

11. The apparatus of claim 10, wherein the length of the transport packet is set to be a multiple of the predetermined number of bytes.

12. The apparatus of claim 11, wherein the predetermined number of bytes is 188 bytes.

13. The apparatus of claim 10, wherein:
    the transport packet includes a header, and the header includes a field indicating the length of the transport packet; and
    the depacketizing unit decodes the transport packet using the field.

14. The apparatus of claim 11, further comprising:
    a synchronization area decoding unit to check the synchronization area of the transport packet for each multiple length of the predetermined byte, and to detect the starting point of the transport packet based on a predetermined rule with respect to the synchronization area to decode the transport packet.

15. A method of generating a transport packet, the method comprising:
    generating by a packet generating unit a transport packet having a variable length, and the length being a multiple of a predetermined number of bytes by packetizing an elementary stream and inverting each bit of a value of a field in a header of the transport packet,
    wherein a synchronization area in the transport packet indicates the variable length.

16. The method of claim 15, wherein the generating comprises:
    allocating an area of the header to the transport packet;
    setting the field in the area of the header, the field indicating the length of the transport packet; and
    indicating the length of the transport packet using the value of the field.

17. The method of claim 15, wherein the generating comprises:
    setting the synchronization area in the transport packet; and
    indicating the length of the transport packet using the synchronization area.

18. A method of depacketizing a transport packet, the method comprising:
    depacketizing by a depacketizing unit a transport packet having a variable length, the length being a multiple of a predetermined number of bytes by checking the transport packet for each multiple length of a predetermined number of bytes and detecting a starting point of the transport packet,
    wherein a synchronization area in the transport packet indicates the variable length.

19. The method of claim 18, wherein:
    the transport packet includes, in a header of the transport packet, a field indicating the length of the transport packet; and
    the depacketizing comprises:
    detecting the starting point of the transport packet using a value of the field; and
    decoding the transport packet from the starting point of the detected packet.

20. The method of claim 18, wherein the depacketizing comprises:
    checking the synchronization area of the transport packet for each multiple length of the predetermined number of bytes; and detecting the starting point of the transport packet based on a predetermined rule with respect to the synchronization area to decode the transport packet.

\* \* \* \* \*